2,991,320
CATALYTIC DEHYDROGENATION PROCESS
George W. Hearne, Lafayette, and Kenneth E. Furman, Richmond, Calif., assignors to Shell Oil Company, a corporation of Delaware
No Drawing. Filed Apr. 7, 1960, Ser. No. 20,556
11 Claims. (Cl. 260—680)

This invention relates to a new catalytic dehydrogenation process which is particularly useful for the production of butadiene and/or isopropene.

The most used commercial process for the production of butadiene and isoprene involves the catalytic dehydrogenation of butylene and amylenes with an iron oxide catalyst promoted with sizeable amounts of potassium carbonate and generally a small amount of chromium oxide. This process requires that the dehydrogenation be effected in the presence of a large excess of steam. Although the patent literature indicates steam to olefin mole ratios as low as 1 to 1, it is well known that much higher ratios are required for efficient operation. In commercial practice this ratio is about at least 8 to 1 and generally around 12 to 1.

In the hitherto used commercial process quite high reaction temperatures are required. The range used commercially generally falls between about 1090 and 1200° F. At these high temperatures and in the presence of the large amounts of steam the activity of the catalyst is maintained by the continuous removal of carbonaceous deposits from the catalyst by the steam-carbon reaction which is catalyzed by the potassium carbonate in the catalyst. Thus the potassium carbonate is an essential ingredient.

An important factor in the production of butadiene and/or isoprene by dehydrogenation is the selectivity of the dehydrogenation process. The percent selectivity is defined as 100 times the moles of desired product produced divided by the moles of feed stock destroyed or otherwise converted. In order to obtain a reasonable selectivity the prior commercial process requires the use of low pressures. Generally pressures between about 5 and 25 p.s.i.a. are used. This necessitates large equipment and complicates the recovery of the product. At these low pressures and under otherwise near optimum conditions, a selectivity around 80% may be obtained at a total conversion around 20% in the dehydrogenation of butylene to butadiene. The operations are sometimes conducted under conditions of temperature and space velocity to obtain conversions as high as about 35%, but generally somewhat lower conversions are preferred because the selectivity drops sharply as the conversion is increased. Thus, one of the major shortcomings of the hitherto used process is that the conversion must be limited to quite low values (about 25%) and this requires the working up of large amounts of material to recover the product and requires a sizeable recycle which further increases the size of the equipment.

One of the reasons for the inability of the presently used commercial process to operate at higher conversion is that the reaction which (for the production of butadiene from butene-1) may be illustrated as follows

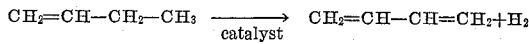

$$CH_2=CH-CH_2-CH_3 \xrightarrow{\text{catalyst}} CH_2=CH-CH=CH_2+H_2$$

is inhibited by the hydrogen liberated. If the hydrogen were removed much higher conversions could be used.

One further shortcoming of the present commercial process is that due to the content of potassium carbonate in the catalyst, the catalyst is very hygroscopic and becomes soft if exposed to the atmosphere. This introduces difficulties in loading the reactors and also other inconveniences.

The object of the present invention is to provide a new and improved process for the catalytic dehydrogenation of normal butylene, tertiary amylenes, and similar higher olefins having up to 6 or 7 carbon atoms to the corresponding diolefins which process has one or more of the following advantages:

(1) The process may be operated with comparatively little or no steam while still retaining the activity of the catalyst at a high level.

(2) The process may be operated at considerably lower temperatures. Whereas it is important to quickly quench the reaction product from the quite high reaction temperature to a safe temperature in the hitherto used commercial process, this is not essential in the process of the present invention where lower temperatures can be used.

(3) Potassium carbonate is not an essential ingredient in the catalyst and in fact its presence is not recommended. Consequently the difficulties due to hygroscopicity of the catalyst are avoided.

(4) The process may be effected at comparatively higher pressures thereby allowing smaller equipment to be used and facilitating the recovery of the product.

(5) The process may be operated at higher conversions without sacrifice of the selectivity. This last is considered the most important of the advantages mentioned.

In general outline these objects are obtained by the process of this invention in which process a vaporized feed stream containing the olefin reactant to be dehydrogenated is passed together with certain specified amounts of oxygen and preferably a small amount of steam at a comparatively low temperatures between about 750 and 1000° F., with a mixed oxide catalyst containing molybdenum oxide and certain specified promoters in certain specified amounts and the vaporous effluent is treated in appropriate ways to recover the desired diolefin as the major reaction product.

Feed stock

The process of the present invention is principally of value at present for the dehydrogenation of normal butylenes to butadiene and/or tertiary amylenes to isoprene but it can also be used to dehydrogenate normal amylenes to piperylene and higher olefins, e.g., hexenes and heptenes, to the corresponding more unsaturated products. The normal butylene may be butene-1 or butene-2, either cis or trans, or a mixture of normal butylenes such, for example, as can be separated from the products obtained in the cracking of petroleum oils or by the catalytic dehydrogenation of normal butane. The tertiary amylene may be any one or a mixture of the amylenes having one tertiary carbon atom. The feed stock may contain inert diluents such as any paraffinic or naphthenic hydrocarbon having up to about 10 carbon atoms. Propylene and isobutylene should, however, not be included in any substantial amounts, i.e., not more than a few percent at most.

Steam

The feed stock is preferably catalytically dehydrogenated in the presence of added steam, but it is to be emphasized that the presence of added steam is only a small benefit and is not essential. Recommended proportions of steam are between about 0.1 to 2 moles per mole of reactant, but as indicated, larger amounts can be used if desired and, on the other hand, steam can be altogether omitted.

Oxygen

In the process of the present invention a certain amount of oxygen is passed with the feed stock through the reaction zone. Recommended amounts are between about 0.3 and 2.0 moles per mole of olefin reactant. The stoichiometric quantity is 0.5 mole per mole of olefin. It is preferred to use a stoichiometric excess e.g., around 1 mole per mole of olefin. The oxygen may be supplied as pure or substantially pure oxygen, or air, or in the form of hydrogen peroxide.

It is generally preferred to maintain the concentration of oxygen in the reactant mixture entering the reactor below about 12 v. percent although somewhat higher concentrations may be used if the concentration of the olefin reactant is at least about 10 v. percent when operating at 30 p.s.i.g., at least 15 v. percent when operating at 100 p.s.i.g. and at least about 20 v. percent when operating at 300 p.s.i.g. Thus when using pure oxygen it is frequently desirable to dilute the mixture with an inert or substantially inert diluent which may be steam, vapors of paraffin hydrocarbons, $CO_2$, or the like. On the other hand, if the amount of oxygen is such that it would constitute more than about 12 v. percent of the reaction mixture the oxygen may be introduced in increments e.g., by injecting part of the oxygen separately into the reaction zone.

Temperature

With the preferred catalyst the dehydrogenation becomes substantial at a minimum temperature around 650° F. The preferred temperatures are between about 750 and 1000° F. Higher temperatures up to about 1050° F. can be used, but only if efficient means are provided to remove the exothermic heat of reaction. The temperatures mentioned are those near the reactor inlet. If a fixed bed of catalyst is used the temperature down stream will be several degrees e.g., 150° F., higher.

Pressure

The preferred pressure is near atmospheric e.g., 5 to 75 p.s.i.a. On the other hand, higher pressures up to about 300 p.s.i.a. can be used and have the advantage of simplifying the product recovery.

Space velocity

In general the process of the present invention allows a higher space velocity to be used. Thus, comparatively small reactors and catalyst inventories can be used. For example, gaseous hourly space velocities up to about 5000 may be employed while still obtaining reasonable conversions. Gaseous hourly space velocity, abbreviated GHSV, is defined as the volumes of reactant vapor calculated under standard condition (STP) passed per hour per unit volume of the catalyst bed. A wide range of space velocities may be used. Generally space velocities between about 50 and 1000 are very satisfactory.

Method of contact

The contact of the feed vapors, oxygen and steam, if any, is preferably effected by providing the catalyst in the form of a fixed foraminous bed of particles maintained at the reaction temperature and passing the feed vapors through the bed in a continuous or substantially continuous manner. In this method of operation the partial pressure of oxygen is high (maximum) at the inlet of the catalyst bed and declines towards the outlet. The concentration of diolefin product, on the other hand, is substantially zero at the inlet of the bed and maximum at the outlet. Thus, the concentration of oxygen is highest where the concentration of the desired product is lowest and the concentration of oxygen is lowest where the concentration of the desired product is highest. This allows very high selectivities to be achieved. It is also possible to use the catalyst in powder form, but certain precautions should be taken. Thus, the powdered catalyst (e.g., passing a 100 mesh U.S. standard sieve) can be dispersed in the reactant vapor mixture and the dispersion passed through the reaction zone. If the reactant vapor mixture is passed up through a fluidized bed of the catalyst the concentrations of the reaction product, oxygen, etc., are substantially equal throughout the catalyst zone (due to the almost perfect mixing in such systems) and under such conditions the results are less favorable, particularly from a selectivity standpoint. Thus, the oxygen instead of reacting mainly with the liberated hydrogen reacts to a greater extent to form carbon dioxide, carbon monoxide and other oxygen-containing side reaction products.

Catalyst

The catalyst used in the process of the present invention differs materially from those used in the commercial process mentioned above. While the catalyst used in the present process may contain some iron oxide this oxide is by no means essential and when present it is used in much smaller concentrations than in the hitherto used catalysts. Also the catalyst used in the process of the present invention preferably contains no potassium carbonate, or the equivalent thereof, and the process does not depned at all upon the steam-carbon reaction to maintain catalyst activity. Nevertheless continuous operation is not only possible but also recommended.

The catalyst used in the present process is fundamentally based on molybdenum oxide promoted with bismuth oxide. It is to be emphasized that molybdenum oxide or bismuth oxide alone or in combination with an inert support is substantially inoperative. The amount of bismuth oxide should be sufficient to supply at least about one molecule of bismuth for each ten molecules of molybdenum and preferably from about 5 to 18 times this minimum amount. These effective proportions correspond essentially in their limits to those represented by the various compounds of the $Bi^{+3}$ and $BiO^{+1}$ cations and one or more of the various molybdate anions as listed by Emelius, in "Modern Aspects of Inorganic Chemistry," D. Van Nostrand, 1945, at pp. 186–187, namely:

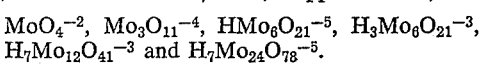

The catalyst may contain supplementary elements such, for instance, as phosphorous and sulfur or other metal oxides which do not materially affect the nature of the catalyst but may reduce its cost. It will be understood, of course, that when a supplementary non-metallic element such as phosphorus is present, such as in the form of a phosphate, it may be in the form of its salt with a suitable metal oxide, including a salt with bismuth oxide, such as bismuth phosphate and in that case this further amount of bismuth is not to be counted in determining the effective ratio of bismuth to molybdenum.

The manner of working of the catalyst is not known and no explanation of the very pronounced synergistic effect can be given. There may be some chemical interaction between the oxides or formation of solid solutions.

The catalyst may be used with or without a filler or carrier material. If a carrier is used it is preferably one having a good thermal conductivity and pores of relatively large size such, for instance, as pellets of alundum, crushed fire brick, pumice, or the like. A filler or binding agent in an amount up to about 50% by weight of the total may be included. Suitable materials are, for example, silica, powdered aluminum, and other inert materials.

The catalyst may be prepared by mixing the dry powders, moistening the mixture with water, alcohol, glycerine or the like to form a paste, and then drying and calcining the paste, e.g., at 500° C. If desired the catalyst may be prepared by precipitating the hydrous oxides of the above-mentioned metals, filtering, mixing in the inert extender, drying and calcining. Alternatively a suitable carrier material may be impregnated with water soluble salts of the materials followed by drying and calcining to convert the salts to the corresponding oxides. During preparation and use the catalyst should not be subjected to temperatures above 600° C. and preferably not above 550° C. Other methods of preparing the mixed oxides will be apparent.

The gaseous mixture issuing from the reaction zone may be quenched but this is normally not essential. Except in some cases when operating at the upper limit of the recommended temperatures there is little tendency for side reactions to take place. The effluent is preferably cooled by indirect heat exchange with the feed and then washed with dilute caustic to neutralize the traces of organic acid present and condense and remove the steam. If air is used to supply the oxygen the remaining mixture is preferably compressed and scrubbed with oil to separate the hydrocarbons from the nitrogen, carbon dioxide, and carbon monoxide. The hydrocarbon may be stripped from the oil and subjected to an extractive distillation or a copper ammonium acetate treatment in the known manner to separate and recover the diolefin.

EXAMPLE 1

Butene-1 was dehydrogenated to butadiene with a catalyst consisting of molybdenum oxide and bismuth oxide (38% $MoO_3$ and 62% $Bi_2O_3$) in the form of a fixed bed of 8–16 mesh granules disposed in an aluminum lined reactor. The butene-1 was mixed with air and steam and preheated to about 300° C. The composition of the feed mixture was approximately as follows:

| | Mole Percent |
|---|---|
| Butene-1 | 10 |
| $O_2$ | 11 |
| $N_2$ | 41 |
| $H_2O$ | 38 |

The mixture was passed through the catalyst bed at a gaseous hourly space velocity of about 62 with respect to the butene and at substantially atmospheric pressure. The reactor was maintained at a nominal or average temperature of 430° C., but due to the exothermic heat of the reaction a maximum temperature of 480° C. was recorded. The reaction mixture was cooled, collected and analyzed. From the analysis of the product it was determined that the butene was 86% converted. The products of reaction consisted of 68.63% of butadiene, 13.39% of carbon dioxide, 7.15% of carbon monoxide, 2.37% furan, 1.45% of acids, and minor amounts of unidentified oxygenated products. 81% of the oxygen was reacted.

EXAMPLE II

Cis-butene-2 was catalytically dehydrogenated to butadiene with air and steam with the same catalyst in a similar manner. The conditions were as follows:

| | |
|---|---|
| Nominal temperature | ° C. 445 |
| Maximum temperature recorded | ° C. 485 |
| Gaseous hourly space velocity | 55 |
| Mole ratio butylene to oxygen | 0.96 |

75% of the butylene was converted and 66% of the oxygen. The conversion products of reaction contained about 60% butadiene, 16.7% carbon dioxide, 10.8% carbon monoxide, 2.5% furan, and minor amounts of acids and other oxygenated products.

This application is a continuation-in-part of our copending application Serial No. 849,448, filed October 29, 1959, now abandoned.

We claim as our invention:

1. Process for selective dehydrogenation of a mono-olefin aliphatic hydrocarbon reactant having from 4 to 7 non-quaternary contiguous carbon atoms to produce as the major reaction product a hydrocarbon having the same number of carbon atoms but at least one more ethylenic bond which comprises passing the aliphatic hydrocarbon in vapor phase together with from about 0.3 to 2 moles of oxygen per mole of reactant through a reaction zone in contact with a solid catalyst therefor consisting essentially of molybdenum oxide and bismuth oxide in catalytically effective proportions to provide essentially bismuth molybdate at a temperature between about 650° F. and 1050° F. and at a pressure between about 5 and 300 p.s.i.a., and recovering the second-mentioned hydrocarbon from the reaction zone effluent.

2. Process for the selective dehydrogenation of a mono-olefin aliphatic hydrocarbon having from 4 to 7 non-quaternary contiguous carbon atoms to produce as the major reaction product a hydrocarbon having the same number of carbon atoms but at least one more ethylenic bond which comprises passing the first said hydrocarbon in the vapor phase together with about an equal molar amount of oxygen through a reaction zone in contact with a solid catalyst comprising as its main active constituent molybdenum oxide and bismuth oxide in a ratio of from 1 to about 18 atoms of bismuth per 10 atoms of molybdenum at a temperature between about 700 and 1000° F., a pressure between about 5 and 300 p.s.i.a., cooling the effluent from said reaction zone, separating fixed gases from a liquid hydrocarbon phase, and extracting said second-mentioned hydrocarbon from unreacted hydrocarbon.

3. Process for the selective catalytic dehydrogenation of a mono-olefin having from 4 to 7 noquaternary carbon atoms to a corresponding diolefin which comprises passing the said olefin in the vapor phase together with from about 0.3 to 2 moles of oxygen per mole of mono-olefin through a reaction zone in contact with the solid catalyst containing as its main active constituent molybdenum oxide and bismuth oxide in a ratio of from 1 to about 18 atoms of bismuth per 10 atoms of molybdenum at a temperature between 650 and 1050° F., a pressure about 5 and 300 p.s.i.a., cooling the effluent from said reaction zone, and extracting the corresponding diolefin product from unreacted mono-olefin.

4. Process for the selective catalytic dehydrogenation of a mono-olefin having from 4 to 7 nonquaternary carbon atoms to a corresponding diolefin which comprises passing the said olefin in the vapor phase together with from about 0.3 to 2 moles of oxygen per mole of mono-olefin through a reaction zone in contact with a fixed foraminous bed of catalyst containing as its main active constituent molybdenum oxide and bismuth oxide in a ratio of from 1 to about 18 atoms of bismuth per 10 atoms of molybdenum at a temperature between about 650 and 1050° F., a pressure between about 5 and 300 p.s.i.a., cooling the effluent from said reaction zone, and extracting the corresponding diolefin product from unreacted mono-olefin.

5. Process for the selective catalytic dehydrogenation of a mono-olefin having from 4 to 7 nonquaternary carbon atoms to a corresponding diolefin which comprises passing said olefin in the vapor phase together with a molar quantity approximately equal to the molar quantity of mono-olefin of oxygen through a reaction zone in contact with a solid catalyst containing as its main active constituent molybdenum oxide and bismuth oxide in a ratio of from 1 to about 18 atoms of bismuth per 10 atoms of molybdenum at a temperature between about 650 and 1050° F., a pressure between about 5 and 300 p.s.i.g., cooling the effluent from said reaction zone, and extracting the corresponding diolefin product from unreacted mono-olefin.

6. Process for the selective catalytic dehydrogenation of a mono-olefin having from 4 to 7 nonquaternary carbon atoms to a corresponding diolefin which comprises passing the said olefin in the vapor phase together with air in an amount equivalent to from about 0.3 to 2 moles of oxygen per mole of mono-olefin through a reaction zone in contact with the solid catalyst containing as its main active constituent molybdenum oxide and bismuth oxide in a ratio of from 1 to about 18 atoms of bismuth per 10 atoms of molybdenum at a temperature between about 650 and 1050° F., a pressure between about 5 and 300 p.s.i.a., cooling the effluent from said reaction zone, and extracting the corresponding diolefin product from unreacted mono-olefin.

7. Process for the selective catalytic dehydrogenation of a mono-olefin having from 4 to 7 nonquaternary carbon atoms to a corresponding diolefin which comprises passing the said olefin in the vapor phase together with from about 0.3 to 2 moles of oxygen per mole of mono-olefin through a reaction zone in contact with a solid catalyst containing as its main active constituent molybdenum oxide and bismuth oxide in a ratio of from 1 to about 18 atoms of bismuth per 10 atoms of molybdenum at a temperature between about 750 and 1000° F., a pressure between about 5 and 300 p.s.i.a., cooling the effluent from said reaction zone, and extracting the corresponding diolefin prouct from unreacted mono-olefin.

8. Process for the selective catalytic dehydrogenation of a mono-olefin having from 4 to 7 nonquaternary carbon atoms to a corresponding diolefin which compirses passing the said olefin in the vapor phase together with from about 0.3 to 2 moles of oxygen per mole of mono-olefin through a reaction zone in contact with a solid catalyst containing as its main active constituent molybdenum oxide and bismuth oxide in a ratio of from 1 to about 18 atoms of bismuth per 10 atoms of molybdenum at a temperature between about 650 and 1050° F., and at about atmospheric pressure, cooling the effluent from said reaction zone and extracting the corresponding diolefin product from unreacted mono-olefin and recycling said unreacted mono-olefin to said reaction zone.

9. Process for the selective catalytic dehydrogenation of a mono-olefin having from 4 to 7 nonquaternary carbon atoms to a corresponding diolefin which comprises passing the said olefin in the vapor phase at a partial pressure of about 1 p.s.i.a. together with from 0.3 to 2 moles of oxygen per mole of mono-olefin through a reaction zone in contact with a solid catalyst containing as its main active constituent molybdenum oxide and bismuth oxide in a ratio of from 1 to about 18 atoms of bismuth per 10 atoms of molybdenum at a temperature between about 650 and 1050° F., a pressure between about 5 and 300 p.s.i.a., cooling the effluent from said reaction zone and extracting the corresponding diolefin product from unreacted mono-olefin and recycling said unreacted mono-olefin to said reaction zone.

10. Process for the dehydrogenation of normal butylene to produce butadiene as the major reaction product which comprises passing normal butylene in vapor phase together with from about 0.3 to 2 moles of oxygen per mole of normal butylene through a reaction zone in contact with a solid catalyst therefor consisting essentially of molybdenum oxide and bismuth oxide in catalytically effective proportions to provide essentially bismuth molybdate at a temperature between about 650° F. and 1000° F. and at a pressure between about 5 and 300 p.s.i.a., and recovering butadiene from the reaction zone effluent.

11. Process in accordance with claim 10 wherein the molybdenum oxide and bismuth oxide are present in a ratio of from 1 to about 18 atoms of bismuth per 10 atoms of molybdenum and the butadiene is recovered by extracting it from unreacted butylene in the reaction zone effluent.

References Cited in the file of this patent
UNITED STATES PATENTS
2,941,007   Callahan _____ June 14, 1960